US012027107B2

(12) United States Patent
Lee et al.

(10) Patent No.: US 12,027,107 B2
(45) Date of Patent: Jul. 2, 2024

(54) DISPLAY APPARATUS

(71) Applicant: Samsung Electronics Co., Ltd., Suwon-si (KR)

(72) Inventors: Donggun Lee, Suwon-si (KR); Punjae Choi, Suwon-si (KR); Youngjin Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/222,155

(22) Filed: Jul. 14, 2023

(65) Prior Publication Data

US 2024/0021145 A1 Jan. 18, 2024

(30) Foreign Application Priority Data

Jul. 15, 2022 (KR) ........................ 10-2022-0087468
Feb. 24, 2023 (KR) ........................ 10-2023-0024819

(51) Int. Cl.
*G09G 3/32* (2016.01)

(52) U.S. Cl.
CPC ....... *G09G 3/32* (2013.01); *G09G 2300/0842* (2013.01); *G09G 2320/0247* (2013.01); *G09G 2320/0633* (2013.01)

(58) Field of Classification Search
CPC ............. G09G 3/32; G09G 2300/0842; G09G 2320/0247; G09G 2320/0633; G09G 2300/0452; G09G 2320/0666; G09G 2320/0693; G09G 2360/16; G09G 3/2003
See application file for complete search history.

(56) References Cited

U.S. PATENT DOCUMENTS

| | | | |
|---|---|---|---|
| 6,372,608 | B1 | 4/2002 | Shimoda et al. |
| 6,645,830 | B2 | 11/2003 | Shimoda et al. |
| RE38,466 | E | 3/2004 | Inoue et al. |
| 6,818,465 | B2 | 11/2004 | Biwa et al. |
| 6,818,530 | B2 | 11/2004 | Shimoda et al. |
| 6,858,081 | B2 | 2/2005 | Biwa et al. |
| 6,967,353 | B2 | 11/2005 | Suzuki et al. |
| 7,002,182 | B2 | 2/2006 | Okuyama et al. |
| 7,084,420 | B2 | 8/2006 | Kim et al. |
| 7,087,932 | B2 | 8/2006 | Okuyama et al. |
| 7,154,124 | B2 | 12/2006 | Han et al. |
| 7,208,725 | B2 | 4/2007 | Sherrer et al. |
| 7,288,758 | B2 | 10/2007 | Sherrer et al. |

(Continued)

FOREIGN PATENT DOCUMENTS

| | | | |
|---|---|---|---|
| CN | 112838151 | A | 5/2021 |
| JP | 2007-250986 | A | 9/2007 |
| JP | 6367590 | B2 | 8/2018 |

*Primary Examiner* — Abhishek Sarma
(74) *Attorney, Agent, or Firm* — Sughrue Mion, PLLC

(57) ABSTRACT

A display apparatus includes a display panel including a plurality of pixels each having red, green, and blue LEDs; a display panel driver applying a current to each of the LEDs; a memory storing current intensity information according to target luminance of each of the LEDs; and a processor controlling the display panel driver to apply a current to each of the LEDs based on the current intensity information, wherein the processor is configured to control the display panel driver to apply an additional current to the green LED when a target luminance of the red LED is smaller than a predetermined luminance.

20 Claims, 17 Drawing Sheets

(56) References Cited

U.S. PATENT DOCUMENTS

| | | | |
|---|---|---|---|
| 7,319,044 B2 | 1/2008 | Han et al. | |
| 7,501,656 B2 | 3/2009 | Han et al. | |
| 7,573,446 B2 | 8/2009 | Kawaguchi et al. | |
| 7,709,857 B2 | 5/2010 | Kim et al. | |
| 7,759,140 B2 | 7/2010 | Lee et al. | |
| 7,781,727 B2 | 8/2010 | Sherrer et al. | |
| 7,790,482 B2 | 9/2010 | Han et al. | |
| 7,940,350 B2 | 5/2011 | Jeong | |
| 7,959,312 B2 | 6/2011 | Yoo et al. | |
| 7,964,881 B2 | 6/2011 | Choi et al. | |
| 7,985,976 B2 | 7/2011 | Choi et al. | |
| 7,994,525 B2 | 8/2011 | Lee et al. | |
| 8,008,683 B2 | 8/2011 | Choi et al. | |
| 8,013,352 B2 | 9/2011 | Lee et al. | |
| 8,049,161 B2 | 11/2011 | Sherrer et al. | |
| 8,129,711 B2 | 3/2012 | Kang et al. | |
| 8,179,938 B2 | 5/2012 | Kim | |
| 8,263,987 B2 | 9/2012 | Choi et al. | |
| 8,324,646 B2 | 12/2012 | Lee et al. | |
| 8,399,944 B2 | 3/2013 | Kwak et al. | |
| 8,432,511 B2 | 4/2013 | Jeong | |
| 8,459,832 B2 | 6/2013 | Kim | |
| 8,502,242 B2 | 8/2013 | Kim | |
| 8,536,604 B2 | 9/2013 | Kwak et al. | |
| 8,735,931 B2 | 5/2014 | Han et al. | |
| 8,766,295 B2 | 7/2014 | Kim | |
| 9,318,659 B2 | 4/2016 | Inoue et al. | |
| 11,362,078 B2 | 6/2022 | Ikeda et al. | |
| 2002/0030449 A1 | 3/2002 | Okazaki et al. | |
| 2018/0145116 A1* | 5/2018 | Lee ...................... | G09G 3/2003 |
| 2019/0335553 A1 | 10/2019 | Ahmed et al. | |
| 2021/0020114 A1* | 1/2021 | Lee ........................ | G09G 3/342 |
| 2021/0193014 A1 | 6/2021 | Schrama | |
| 2021/0249394 A1* | 8/2021 | Ikeda ................... | G09G 3/2003 |

* cited by examiner

DISPLAY APPARATUS

CROSS-REFERENCE TO RELATED APPLICATION(S)

This application claims priority to Korean Patent Application No. 10-2022-0087468 filed on Jul. 15, 2022 and Korean Patent Application No. 10-2023-0024819 filed on Feb. 24, 2023, in the Korean Intellectual Property Office, the disclosures of which are incorporated by reference herein in their entireties.

BACKGROUND

The present disclosure relate to a display apparatus.

A semiconductor light emitting diode (LED) is used as a light source for a light source for lighting devices and various electronic products. Also, an LED may be widely used as a light source for various display devices such as a television (TV), a mobile phone, a personal computer (PC), a notebook PC, and a personal digital assistant (PDA).

Recently, a semiconductor LED emitting light of different wavelengths (e.g., blue light, green light, and red light) without a backlight has been developed for use as a sub-pixel light source. The display apparatus may be miniaturized, and may also implement a display apparatus having high luminance and excellent light efficiency as compared to a liquid-crystal display (LCD).

SUMMARY

One or more example embodiments provide a display apparatus which may provide high color reproducibility despite changes in wavelengths of semiconductor LEDs, which are a portion of light sources.

According to an aspect of an example embodiment, a display apparatus includes: a display panel including a plurality of pixels, each pixel of the plurality of pixels including a plurality of semiconductor light emitting devices configured to emit light of different colors; a display panel driver configured to drive the display panel by applying a current to each semiconductor light emitting device of the plurality of semiconductor light emitting devices; a memory configured to store current intensity information according to a target luminance for each semiconductor light emitting device of the plurality of semiconductor light emitting devices; and a processor configured to obtain the current intensity information from the memory based on gradation of an image to be displayed, and control the display panel driver to apply the current to each of the plurality of semiconductor light emitting devices based on the current intensity information, wherein the plurality of semiconductor light emitting devices of each pixel of the plurality of pixels includes a first semiconductor light emitting device configured to emit blue light, a second semiconductor light emitting device configured to emit green light, and a third semiconductor light emitting device configured to emit red light, and wherein the processor is further configured to, based on a target luminance of the third semiconductor light emitting device being smaller than a predetermined luminance, control the display panel driver to apply an additional current to the second semiconductor light emitting device.

According to an aspect of an example embodiment, a display apparatus includes: a display panel including a plurality of pixels, each pixel of the plurality of pixels including a plurality of semiconductor light emitting devices configured to emit light of different colors; a display panel driver configured to drive the display panel by applying a current to each pixel of the plurality of semiconductor light emitting devices; a memory configured to store current intensity information according to target luminance for each semiconductor light emitting device of the plurality of semiconductor light emitting devices; and a processor configured to obtain the current intensity information from the memory based on gradation of an image to be displayed, and control the display panel driver to apply the current to each semiconductor light emitting device of the plurality of semiconductor light emitting devices based on the current intensity information, wherein the plurality of semiconductor light emitting devices includes a first semiconductor light emitting device configured to emit blue light, a second semiconductor light emitting device configured to emit green light, a third semiconductor light emitting device configured to emit red light, and a fourth semiconductor light emitting device configured to emit tuning light having a peak wavelength between a wavelength of the green light and a peak wavelength of the red light, and wherein the processor is further configured to, based on the target luminance of the third semiconductor light emitting device being less than a predetermined luminance, control the display panel driver to apply a current to the fourth semiconductor light emitting device.

According to an aspect of an example embodiment, a display apparatus includes: a display panel including a plurality of pixels, each pixel of the plurality of pixels including a first semiconductor light emitting device configured to emit blue light, a second semiconductor light emitting device configured to emit green light, and a third semiconductor light emitting device configured to emit red light; a display panel driver configured to apply a first current, a second current, and a third current to the first semiconductor light emitting device, the second semiconductor light emitting device, and the third semiconductor light emitting device, respectively; and a processor configured to control the display panel driver to apply the first current, the second current, and the third current to the first semiconductor light emitting device, the second semiconductor light emitting device, and the third semiconductor light emitting device, respectively, based on gradation of an image to be displayed, wherein the processor is further configured to: based on the third current of the third semiconductor light emitting device being less than predetermined reference current, control the display panel driver to apply an additional current to the second semiconductor light emitting device, and based on the third current of the third semiconductor light emitting device being greater than the predetermined reference current, control the display panel driver to not apply the additional current to the second semiconductor light emitting device.

BRIEF DESCRIPTION OF THE DRAWINGS

The above and other aspects, features, and advantages of the present disclosure will be more clearly understood from the following detailed description, taken in combination with the accompanying drawings, in which.

DETAILED DESCRIPTION

Hereinafter, example embodiments of the present disclosure will be described as follows with reference to the accompanying drawings.

Figure 1:
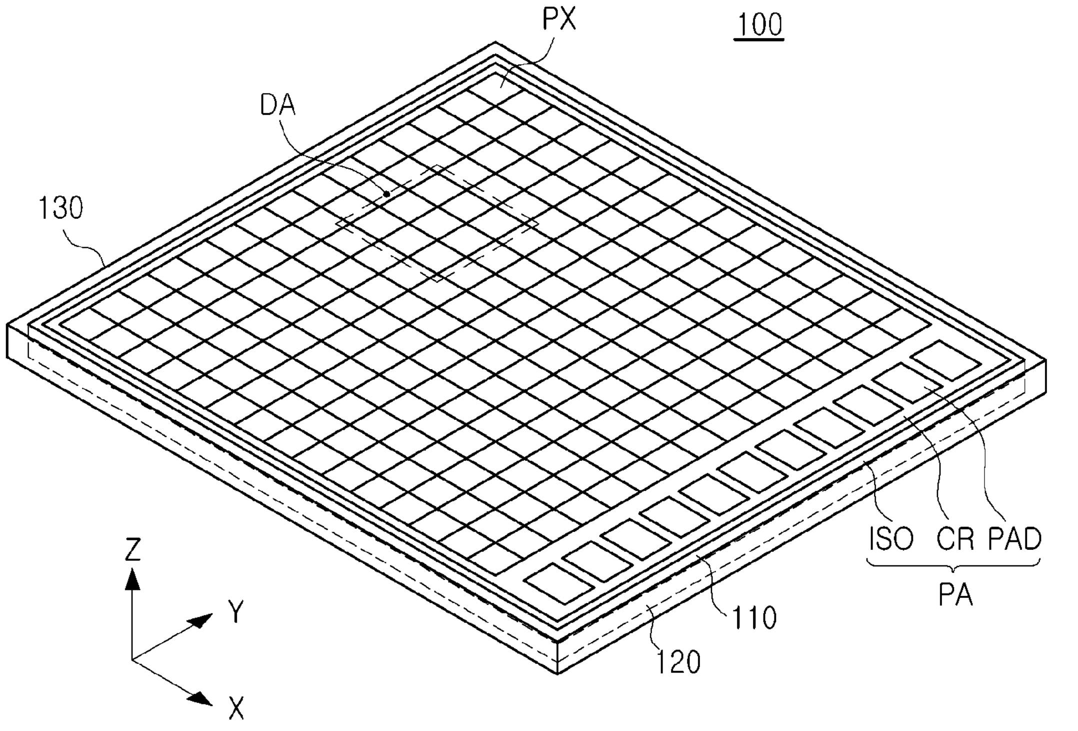
FIG. 1 is a perspective diagram illustrating a display panel according to an example embodiment of the present disclosure.
Figure 2:
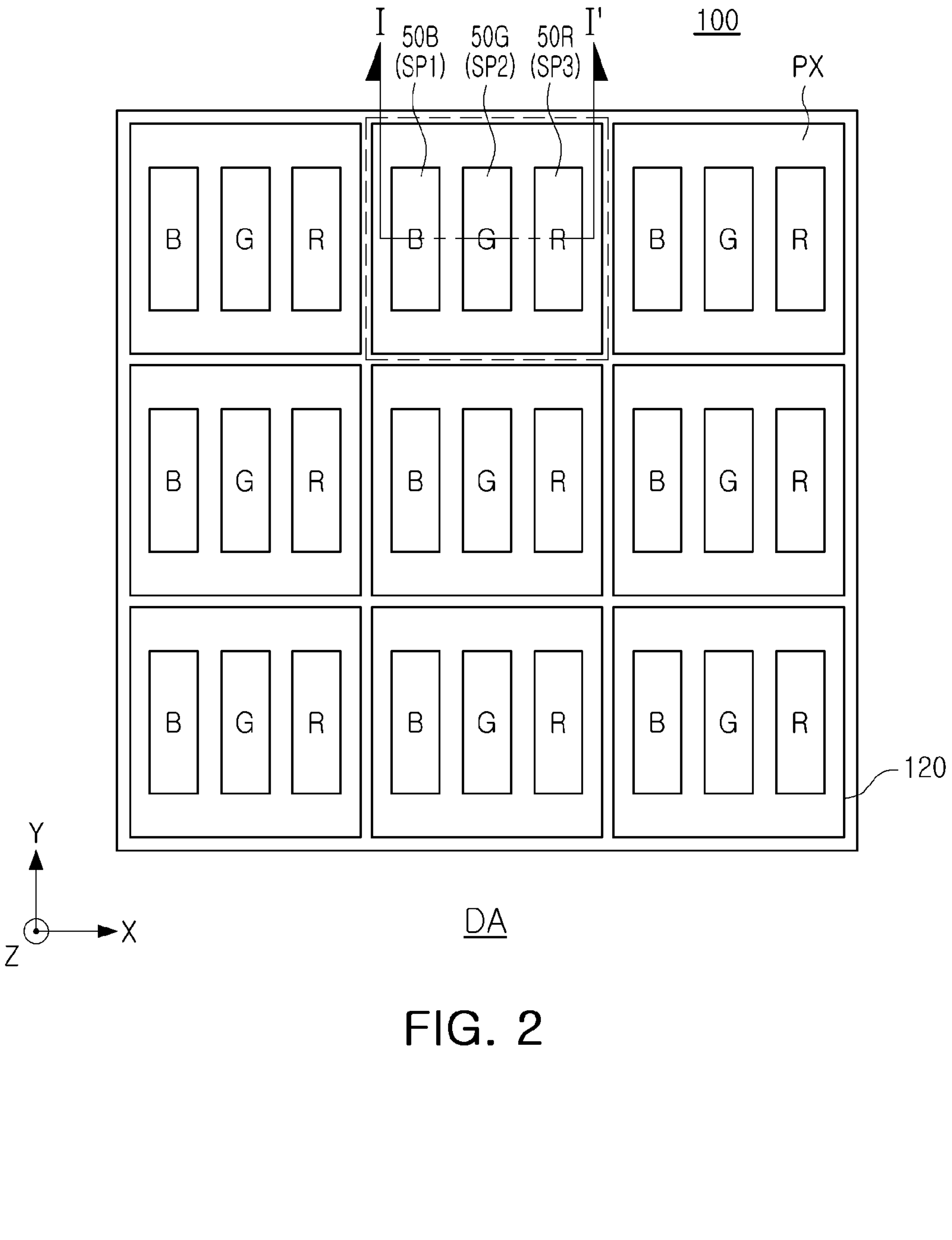
FIG. 2 is a plan diagram illustrating a portion of the example in FIG. 1.

FIG. 1 is a perspective diagram illustrating a display panel according to an example embodiment. FIG. 2 is a plan diagram illustrating a portion of the example in FIG. 1.

Referring to FIGS. 1 and 2, the display panel 100 (or display apparatus) according to the example embodiment may include a circuit board 120 having a driver circuit and a pixel array 110 disposed on the circuit board 120 and having a plurality of pixels PX arranged thereon. The display panel 100 may further include a frame 130 surrounding the circuit board 120 and the pixel array 110.

The circuit board 120 may include a driver circuit including thin film transistor (TFT) cells. In example embodiments, the circuit board 120 may further include other circuits in addition to driver circuits for the display apparatus. In example embodiments, circuit board 120 may be implemented as a flexible substrate and the display panel 100 may have a curved profile.

The display panel 100 may include a display area DA and a peripheral area PA on at least one side of the display area DA. The display area DA may include a region in which a plurality of pixels PX are arranged, and the peripheral area PA may include a pad region PAD, a connection region CR connecting a plurality of pixels PX to the pad regions PAD, and an outer region ISO.

Referring to FIG. 2, each of a plurality of pixels PX may include first, second, and third sub-pixels SP1, SP2, and SP3 for emitting light of different colors to provide a color image. The first, second, and third sub-pixels SP1, SP2, and SP3 may include first, second, and third semiconductor light emitting devices (e.g., light emitting diodes) 50B, 50G, and 50R configured to emit lights of different colors. In each pixel PX (or a pixel unit), the first, second, and third sub-pixels SP1, SP2, and SP3 may be arranged side by side in one direction (e.g., X direction). However, embodiments are not limited thereto, and in example embodiments, the first, second, and third sub-pixels SP1, SP2, and SP3 may be arranged in other patterns such as a Bayer pattern (e.g., see FIGS. 14 and 15). In another example embodiment, each pixel PX may be configured in a different arrangement, such as 3×3 or 4×4.

In the example embodiment, the first, second, and third semiconductor light emitting devices 50B, 50G, and 50R may be configured to emit blue (B) light, green (G) light, and red (R) light, respectively. The first, second, and third sub-pixels SP1, SP2, and SP3 in the example embodiment may include semiconductor light emitting devices 50 without an additional wavelength converter.

Figure 3:
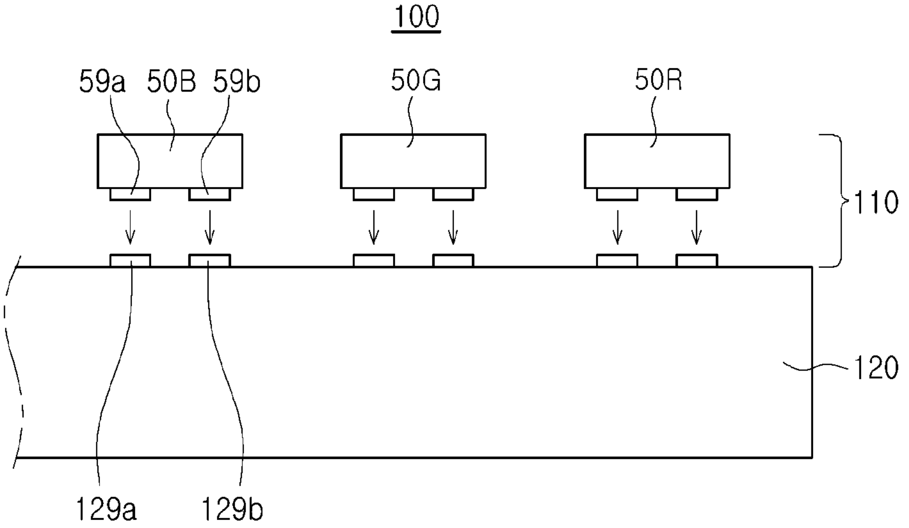
FIG. 3 is a cross-sectional diagram illustrating a display panel according to an example embodiment of the present disclosure.

FIG. 3 is a cross-sectional diagram illustrating a pixel of a display panel according to an example embodiment, taken along line I-I'.

Referring to FIG. 3, the display panel 100 may be disposed on a circuit board 120, and may have first, second, and third semiconductor light emitting devices 50B, 50G, and provided as light sources of sub-pixels. In the example embodiment, electrodes 59*a* and 59*b* of the first, second, and third semiconductor light emitting devices 50B, 50G, and 50R may be flip-chip bonded to the pads 129*a* and 129*b* of the circuit board 120, respectively, and may be electrically connected to the driver circuit. The first, second, and third semiconductor light emitting devices 50B, 50G, and 50R may emit light of different colors by a driving current provided from a driver circuit. In example embodiments, the first, second, and third semiconductor light emitting devices 50B, 50G, and 50R may include semiconductor LEDs grown on the same substrate.

The first semiconductor light emitting device 50B may include a first active layer configured to emit light having a peak wavelength of 440 nm to 480 nm, the second semiconductor light emitting device 50G may include a second active layer configured to emit light having a peak wavelength of 510 nm to 550 nm, and the third semiconductor light emitting device 50R may include a third active layer configured to emit light having a peak wavelength of 610 nm to 650 nm. Each of the first, second, and third semiconductor light emitting devices may include a nitride single crystal, and the first, second, and third active layers may include InGaN quantum well layers having different indium composition ratios.

The first, second, and third semiconductor light emitting devices 50B, 50G, and in the example embodiment may be implemented as μ-LEDs. A μ-LED may refer to a micro-semiconductor LED having a size of less than 100 micrometers (μm) which may emit light without a backlight or a color filter.

Figure 4:
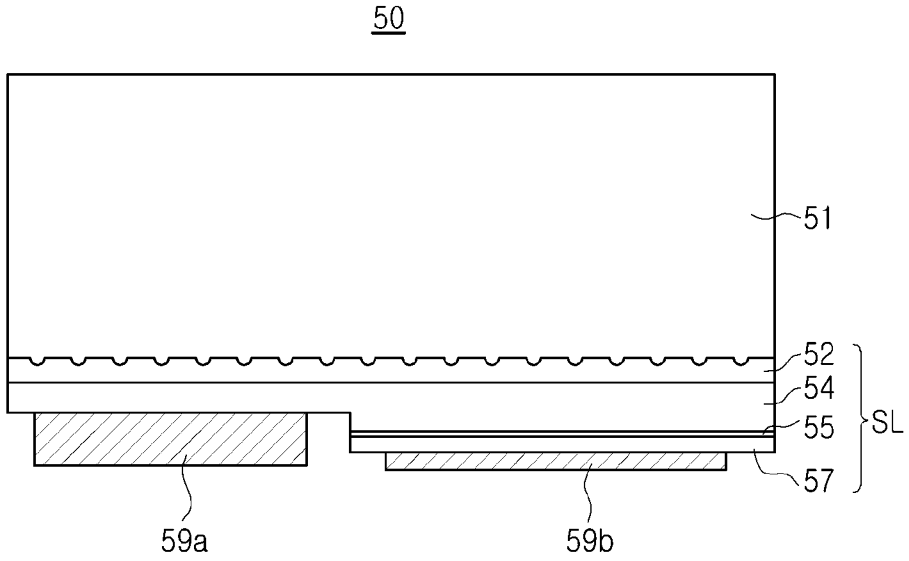
FIG. 4 is a cross-sectional diagram illustrating a semiconductor light emitting device included in the display panel illustrated in FIG. 3.

FIG. 4 is a cross-sectional diagram illustrating a semiconductor light emitting device 50 included in the display panel 100 illustrated in FIG. 3.

Referring to FIG. 4, a semiconductor light emitting device 50 may be understood as an example of first, second, and third semiconductor light emitting devices 50B, 50G, and 50R. The semiconductor light emitting device 50 may include a substrate 51 and a semiconductor laminate SL disposed on the substrate 51. The semiconductor laminate (SL) may include a first conductive semiconductor layer 54, an active layer 55, and a second conductive semiconductor layer 56 disposed in order on the substrate 51. Also, the semiconductor light emitting device 50 may further include a buffer layer 32 disposed between the substrate 51 and the first conductive semiconductor layer 34.

The substrate 51 may be an insulating substrate such as sapphire or a semiconductor substrate such as silicon (Si). An upper surface of the substrate 51 may have an unevenness P formed thereon. The unevenness P may improve light extraction efficiency and quality of a grown single crystal.

The buffer layer 32 may include undoped $In_xAl_yGa_{1-x-y}N$ ($0 \le x \le 1$, $0 \le y \le 1$). For example, the buffer layer 32 may be GaN, AlN, AlGaN, or InGaN. If desired, a plurality of layers may be combined or a composition may be gradually changed.

The first conductive semiconductor layer 54 may be a nitride semiconductor satisfying n-type $In_xAl_yGa_{1-x-y}N$ ($0 \le x < 1$, $0 \le y < 1$, $0 \le x+y < 1$), and n-type impurities may be Si. For example, the first conductive semiconductor layer 54 may include n-type GaN. The second conductive semiconductor layer 56 may be a nitride semiconductor layer satisfying p-type $In_xAl_yGa_{1-x-y}N$ ($0 \le x < 1$, $0 \le y < 1$, $0 \le x+y < 1$), and p-type impurities may be Mg. For example, the second conductive semiconductor layer 56 may be implemented as a single-layer structure, or may have a multilayer structure having different compositions in example embodiments.

The active layer 55 may have a multiple quantum well (MQW) structure in which quantum well layers and quantum barrier layers are alternately stacked. For example, the quantum well layer and the quantum barrier layer may be $In_xAl_yGa_{1-x-y}N$ ($0 \le x \le 1$, $0 \le y \le 1$, $0 \le x+y \le 1$) having different compositions. In example embodiments, the quantum well layer may be $In_xGa_{1-x}N$ ($0 < x \le 1$), and the quantum barrier layer may be GaN or AlGaN. Thicknesses of the quantum well layer and the quantum barrier layer may be in the range of 1 nm to 50 nm. The active layer 55 is not limited to a multiple quantum well structure and may have a single quantum well structure.

The first and second electrodes 59*a* and 59*b* may be disposed on a mesa-etched region of the first conductive semiconductor layer 54 and the second conductive semiconductor layer 56 so as to be disposed on the same surface. Although not limited thereto, the first electrode 59*a* may include a material such as Ag, Ni, Al, Cr, Rh, Pd, Ir, Ru, Mg, Zn, Pt, or Au, and may include a single layer or two or more layers. In example embodiments, the second electrode 59*b* may include at least one of Al, Au, Cr, Ni, Ti, and Sn.

Luminance of the semiconductor light emitting device 50 may be adjusted by the intensity of driving current, but an emission wavelength may be changed according to intensity of driving current. The changes in the emission wavelength may increase as the indium content of the active layer, in particular, the quantum well layer increases. In the third semiconductor light emitting device 50R emitting red light, a change in emission wavelength may be relatively large.

Figure 5A:
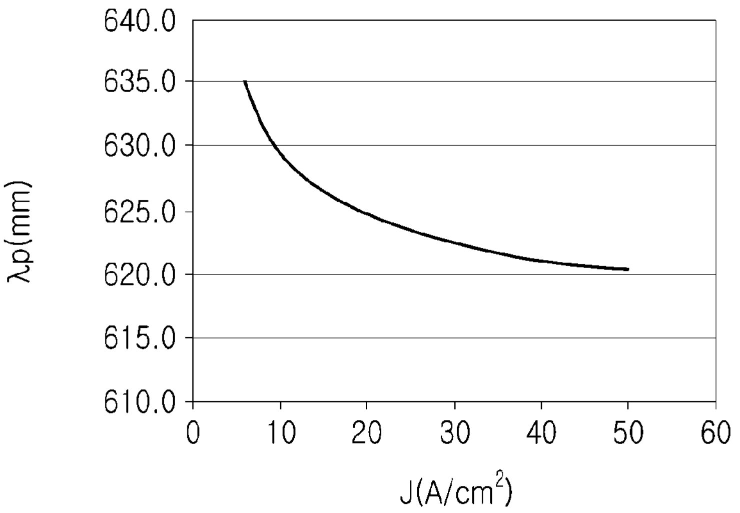
FIGS. 5A and 5B are graphs indicating changes in wavelength and color coordinates depending on a magnitude of a driving current flowing through a red semiconductor light emitting device.
Figure 5B:
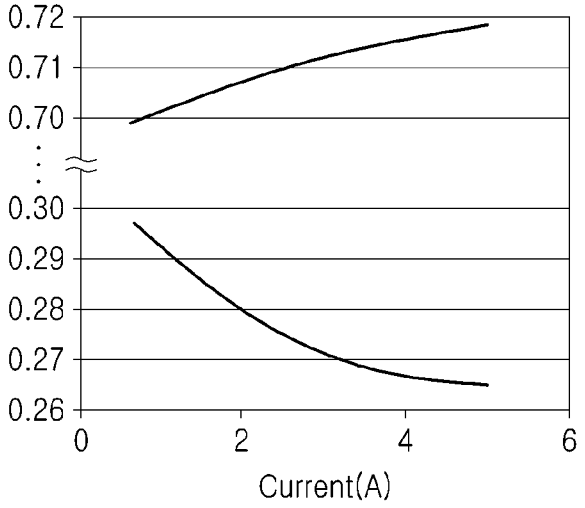

FIGS. 5A and 5B are graphs indicating changes in wavelength and color coordinates depending on a magnitude of a driving current flowing through a red semiconductor light emitting device.

Referring to FIG. 5A, when driving current intensity of the third semiconductor light emitting device 50R is increased, an emission wavelength may be shortened, and when the driving current intensity is decreased, an emission wavelength may be increased. For example, when the current density is increased by about 40 $A/cm^2$, the peak wavelength of the emitted light may change by about 15 nm. In example embodiments, the difference between a peak wavelength of light emitted at current intensity for maximum target luminance and a peak wavelength of light emitted at current intensity for minimum target luminance in the third semiconductor light emitting device 50R may be 10 nm or more (e.g., 20 nm or more).

Accordingly, as illustrated in FIG. 5B, the color coordinate of the red light emitted from the third semiconductor light emitting device 50R may be changed according to an intensity of driving current. For example, as the current intensity (or current density) increases, the x coordinate may increase and the y coordinate may decrease, thereby changing the color coordinate of red light. A color gamut displayed by a display may be changed due to the change in color coordinates. As such, the current density applied to the third semiconductor light emitting device 50R may change according to the change in gradation, and accordingly, the color gamut may change. To address the issue described above, in low gradation, that is, when the current density is low, red light emitted from the semiconductor light emitting device may be calibrated using a sub-pixel light source emitting green light (the second semiconductor light emitting device 50G) or an additional light source emitting light on a green-red locus.

In the pixel array 110 in FIG. 1, the plurality of pixels PX may be arranged in a 15×15 array, but the number of rows and columns may be a suitable number, for example, 1,024×768. For example, depending on the desired resolution, the plurality of pixels PX may have different arrangements.

The pad regions PAD may be disposed on at least one side of the plurality of pixels PX along the edge of the display panel 100. The pad regions PAD may be electrically connected to a plurality of pixels PX and driver circuits of the circuit board 120. The pad regions PAD may electrically connect an external device to the display panel 100. In example embodiments, the number of pad regions PAD may be varied, and may be determined according to, for example, the number of pixels PX and a method of driving a TFT circuit in the circuit board 120.

The connection region CR may be disposed between the plurality of pixels PX and the pad regions PAD. A wiring structure electrically connected to the plurality of pixels PX, for example, a common electrode, may be disposed in the connection region CR. The outer region ISO may be an edge region of the display panel 100.

The frame 130 may be provided as a guide defining the display panel 100. For example, the frame 130 may include at least one of materials such as polymer, ceramic, semiconductor, or metal. In example embodiments, frame 130 may include a black matrix, a white matrix, or other colored structures. For example, the white matrix may include a reflective material or a scattering material. The display panel 100 in FIG. 1 may have a rectangular planar structure, or may have other shapes in example embodiments.

Figure 6:
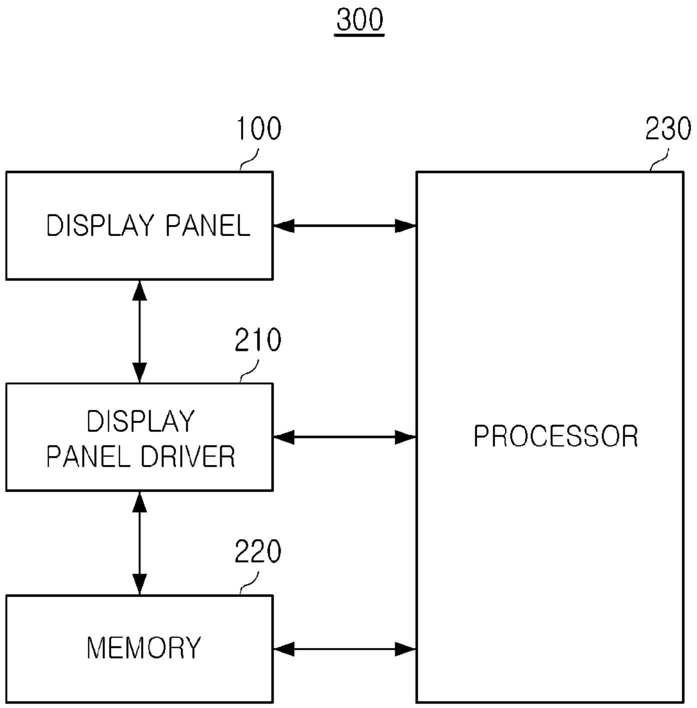
FIG. 6 is a block diagram illustrating components of a display apparatus according to an example embodiment of the present disclosure.

FIG. 6 is a block diagram illustrating components of a display apparatus according to an example embodiment.

Figure 7:
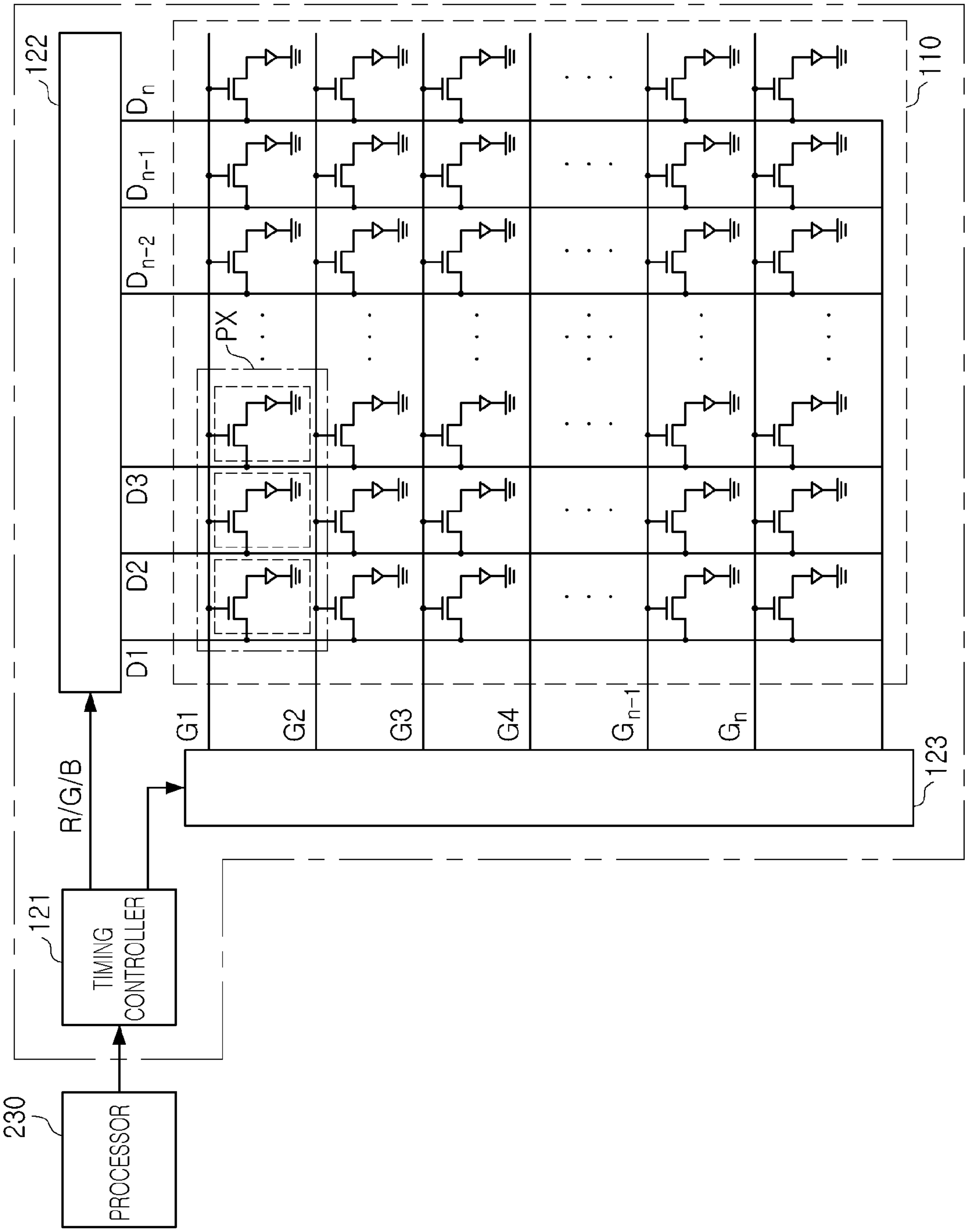
FIG. 7 is a circuit diagram illustrating a display panel and a panel driver according to an example embodiment of the present disclosure.

FIG. 7 is a circuit diagram illustrating a display panel and a panel driver according to an example embodiment.

Referring to FIGS. 6 and 7, the display apparatus 300 according to the example embodiment may include a display panel 100, a display panel driver 210, a memory 220 and a processor 230.

The display apparatus 300 according to example embodiments may be a device configured to execute an application or to display content, and may be used as, for example, a digital television, a tablet personal computer (PC), a portable multimedia player (PMP), personal digital assistant (PDA), a smart phone, a mobile phone, a digital picture frame, a digital signage, kiosk.

The display panel 100 may include a plurality of pixels PX arranged in a matrix form (see FIGS. 1 and 2). As described above, each of the plurality of pixels PX may be provided as first, second, and third sub-pixels SP1, SP2, and SP3, and the first, second, and third sub-pixels SP1, SP2, and SP3 may include first, second, and third semiconductor light emitting devices 50B, 50G, and 50R configured to emit light of different colors (B, G, and R) as light sources.

The display panel driver 210 may drive the display panel 100 under control of the processor 230. For example, the display panel driver 210 may be configured to apply driving current to drive the semiconductor light emitting devices 50B, 50G, and 50R, which are light sources of sub-pixels SP1, SP2, and SP3 under control of the processor 230.

Referring to FIG. 7, the display panel 100 may be formed such that gate lines GL1 to GLn and data lines DL1 to DLn may intersect each other, and the first, second, and third sub-pixels SP1, SP2, and SP3 may be formed in the intersecting regions. The first, second, and third sub-pixels SP1, SP2, and SP3 adjacent to each other may form a pixel PX. As such, each pixel PX may include a first sub-pixel SP1 emitting red light, a second sub-pixel SP2 emitting green light, and a sub-pixel SP3 emitting blue light, and may reproduce the color of an image using three primary colors of red, green, and blue.

In example embodiments, at least a portion of the display panel driver 210 may be implemented on a circuit board (120 in FIG. 1) of the display panel 100. The display panel driver 210 may include a timing controller 121, a data driver 122, and a gate driver 123.

The timing controller 121 may receive an input signal, a horizontal sync signal, a vertical sync signal, and a main clock signal from an external entity, may generate an image data signal, a scan control signal, a data control signal, and a light emission control signal and may provide the signals to a data driver 122 and a gate driver 123.

The data driver 122 may be configured to generate a data signal, and may receive image data of R/G/B components from the processor 230 and may generate a data signal. Also, the data driver 122 may be connected to the data lines DL1, DL2, DL3, . . . , DLn−2, DLn−1, and DLn of the display panel 100 and may apply a data signal to sub-pixels arranged in specific columns of the display panel 100 of the display.

The gate driver 123 (or a scan driver) may be configured to generate a gate signal (or a scan signal), may be connected to a gate line GL1, GL2, GL3, . . . , GLn−1, and GLn and may transfer a gate signal to sub-pixels arranged in a specific row of the display panel 100. The data signal output by the data driver 122 may be transferred to the pixel to which the gate signal is transmitted.

The display panel driver 210 may control luminance of a sub-pixel light source, that is, a semiconductor light emitting device, by varying the intensity of current. The current intensity may be controlled in a variety of manners. For example, the display panel driver 210 may control luminance of a semiconductor light emitting device using pulse width modulation (PWM) and/or pulse amplitude modulation (PAM) in which a duty ratio is varied.

Figure 8:
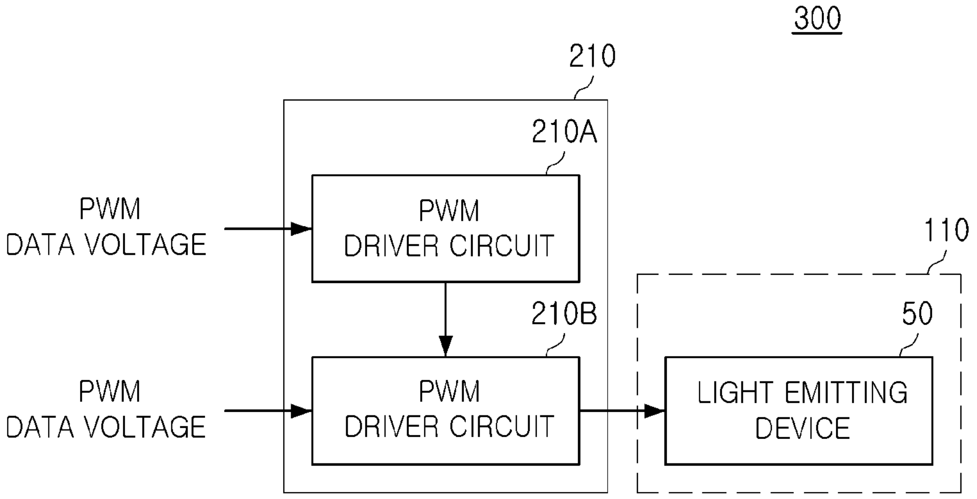
FIG. 8 is a block diagram illustrating a driving circuit of a sub-pixel (a semiconductor LED) according to an example embodiment of the present disclosure.

However, in low gradation, that is, when the current intensity is lowered, in the PWM method, the duty ratio may excessively decrease and a flicker phenomenon may occur. Accordingly, the display panel driver 210 in the example embodiment may control current intensity using PAM or may further control current intensity using a combination of PAM/PWM. FIG. 8 is a block diagram illustrating a driving circuit of a sub-pixel (a semiconductor LED) according to an example embodiment.

Referring to FIG. 8, the display panel driver 210 in the example embodiment may include a PAM driver circuit 210B and a PWM driver circuit 210A. The display panel driver 210 may receive a PAM data voltage and a PWM data voltage and may control an amplitude width and a pulse width of driving current for driving the semiconductor light emitting device 50 together.

Figure 9A:
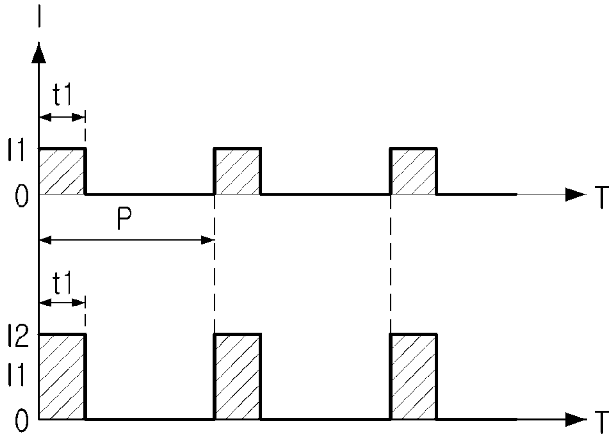
FIGS. 9A and 9B are pulse cycles illustrating a driving method for adjusting luminance of a sub-pixel (a semiconductor LED)

The PAM driver circuit 210B may be configured to control an amplitude width of a driving current applied to the semiconductor light emitting device 50 based on the applied PAM data voltage. As illustrated in FIG. 9A, the current intensity may be adjusted by increasing or decreasing an amplitude width (I1→I2) while maintaining a duty ratio, that is, a pulse width (t1=t1).

Figure 9B:
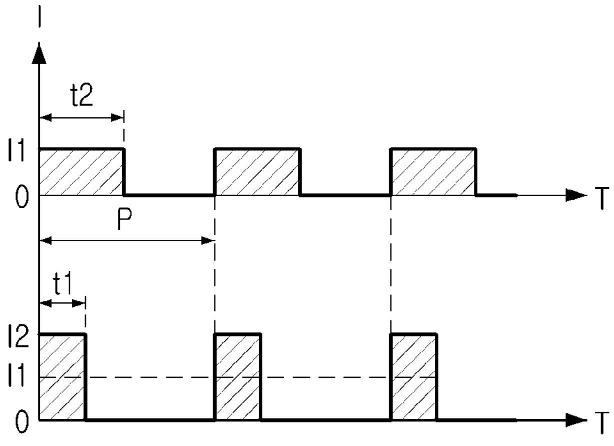
Figure 10A:
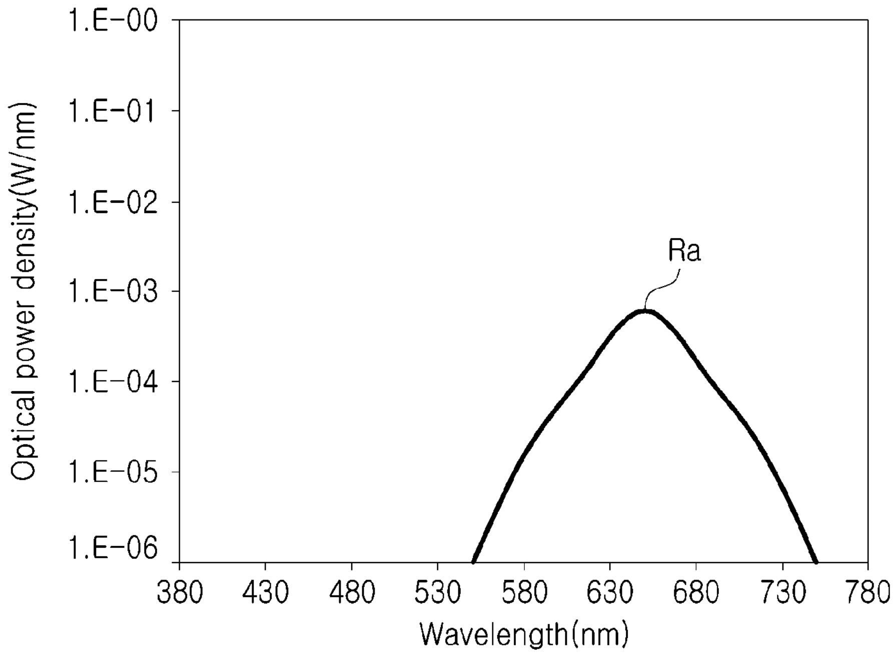
FIG. 10A is a graph illustrating a light emission spectrum of a first red LED.
Figure 10B:
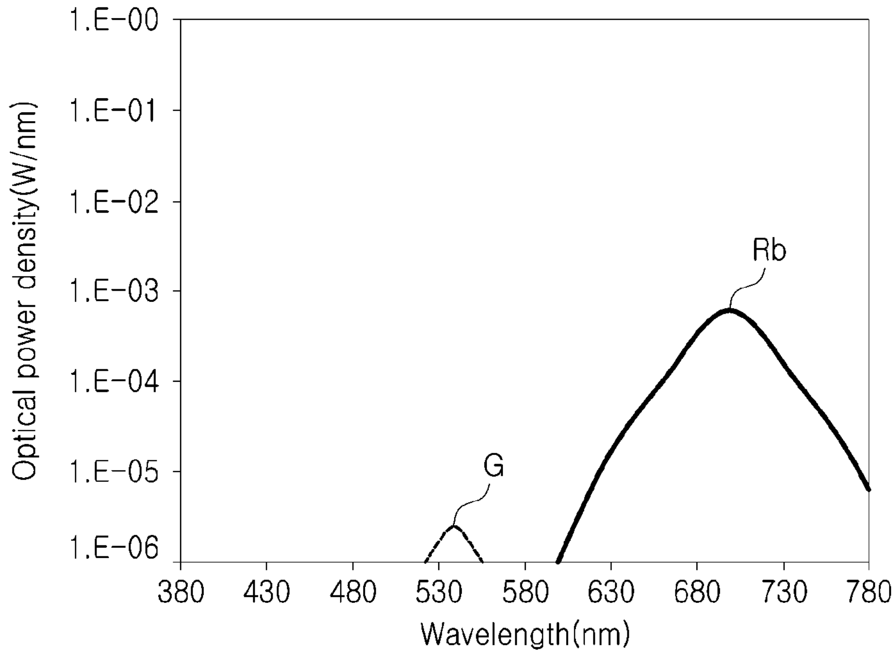
FIG. 10B is a graph illustrating a light emission spectrum of a second red LED and a green LED for adjustment.

Also, the display panel driver 210 may include a PWM driver circuit 210A together with a PAM driver circuit 210B, and the PWM driver circuit 210A may control the pulse width of the driving current applied to the semiconductor light emitting device 50 based on the applied PWM data voltage. The current intensity may be controlled by changing the width amplitude along with the pulse width, that is, the duty ratio. For example, as illustrated in FIG. 9B, the current intensity may be maintained by increasing the amplitude width (I1→I2) while decreasing the pulse width (t2→t1).

The display panel driver 210 may control the driving current provided to the semiconductor light emitting device 50 using the PAM driver circuit 210B, or the PWM driver circuit 210A and the PAM driver circuit 210B, and to prevent a phenomenon such as flicker at low gradation, the pulse amplitude width, that is, the current intensity may be changed, such that, as described above, the wavelength of the light emitted from the third semiconductor light emitting device 50R, that is, unintended changes in color may occur. In the example embodiment, in low gradation, that is, when the current density is low, red light emitted from the third semiconductor light emitting device 50R may be corrected using a sub-pixel light source emitting green light (the second semiconductor light emitting device 50G) as for the color changes of the third semiconductor light emitting device 50R. The color calibration may be implemented through control of the display panel driver 210 by the processor 230.

The memory 220 may store current intensity information according to target luminance of the semiconductor light emitting device 50 of each sub-pixel. The current intensity information may refer to current intensity information according to target luminance of each semiconductor light emitting device 50, and may further include a duty ratio (or a pulse width) along with a pulse amplitude width.

The processor 230 may obtain current intensity information according to the target luminance of the semiconductor light emitting device 50 of each sub-pixel from the memory 220 based on gradation of the image to be displayed, and may control the display panel driver 210 to apply current to the semiconductor light emitting device 50 of each sub-pixel based on the obtained current intensity information.

Specifically, when implementing gradation of an image, gradation of a corresponding pixel may be represented by applying the same predetermined current to each pixel and configuring current intensity (in particular, the amplitude width of the pulse) for each gradation of each pixel to be different. Here, the predetermined current may be determined based on characteristics of the plurality of semiconductor light emitting devices 50 included in sub-pixels of the display panel 100. A sub-pixel in a region having high gradation may increase the current intensity (e.g., a pulse amplitude width), and a sub-pixel in a region having low gradation may decrease the current intensity (e.g., pulse amplitude width), thereby displaying the desired gradation value.

For example, when the target luminance is determined, the processor 230 may adjust the intensity of the current applied to the semiconductor light emitting device 50 based on the current intensity information stored in the memory 220, and may control the display panel driver 210 to adjust the adjusted current intensity to implement target luminance.

Specifically, the processor 230 may control the display panel driver 210 to adjust an amplitude width or amplitude width and a duty ratio to which current is applied to reduce current applied to the semiconductor light emitting device 50 based on the current intensity information stored in the memory 220 and to implement target luminance.

The processor 230 may control the display panel driver 210 such that additional current is applied to the second semiconductor light emitting device 50G when target luminance of the third semiconductor light emitting device 50R is smaller than predetermined luminance (low gradation). Specifically, when target luminance of the third semiconductor light emitting device 50R is low gradation, an adjusted target luminance may be determined to add the luminance for red calibration to the target luminance of the second semiconductor light emitting device 50G required in the corresponding image. To obtain the adjusted target luminance, the long-wavelength color of the third semiconductor light emitting device 50R may be calibrated by applying an additional current to the second semiconductor light emitting device 50G.

In example embodiments, the processor 230 may increase an additional current applied to the second semiconductor light emitting device 50G in proportion to a difference between target luminance of the third semiconductor light emitting device and predetermined luminance.

When the target luminance of the third semiconductor light emitting device 50R is greater than the predetermined luminance (high gradation), the processor 230 may control the display panel driver 210 to not apply additional current to the second semiconductor light emitting device.

As for long wavelength red light, that is, color change, color calibration may be realized by adding green light. FIG. 8A is a graph illustrating an emission spectrum of a first red LED, and FIG. 8B is a graph illustrating an emission spectrum of a second red LED and a green LED for adjustment.

Referring to FIG. 8A, the first red light Ra spectrum may have a peak wavelength of 650 nm and a full width at half maximum (FWHM) of 40 nm, and a color coordinate of the first red light Ra may be (0.6929, 0.3068). Referring to FIG. 8B, the second red light Rb spectrum may have a peak wavelength of 700 nm and a full width at half maximum (FWHM) of 40 nm, and a color coordinate of the second red light Rb may be (0.7221, 0.2778).

Additionally, as illustrated in FIG. 8B, by mixing the second red light Rb (30 mW) with green light G (0.09 mW) having a peak wavelength of 540 nm and a full width at half maximum (FWHM) of 40 nm, the mixed second red light Rb may have the same color coordinate (0.6929, 0.3068) as the color coordinate of the first red light Ra.

By adding green light G having a relatively small output to the long-wavelength second red light Rb, color calibration may be performed such that the second red light Rb may have the same color coordinate as that of the first red light Ra.

Figure 11:
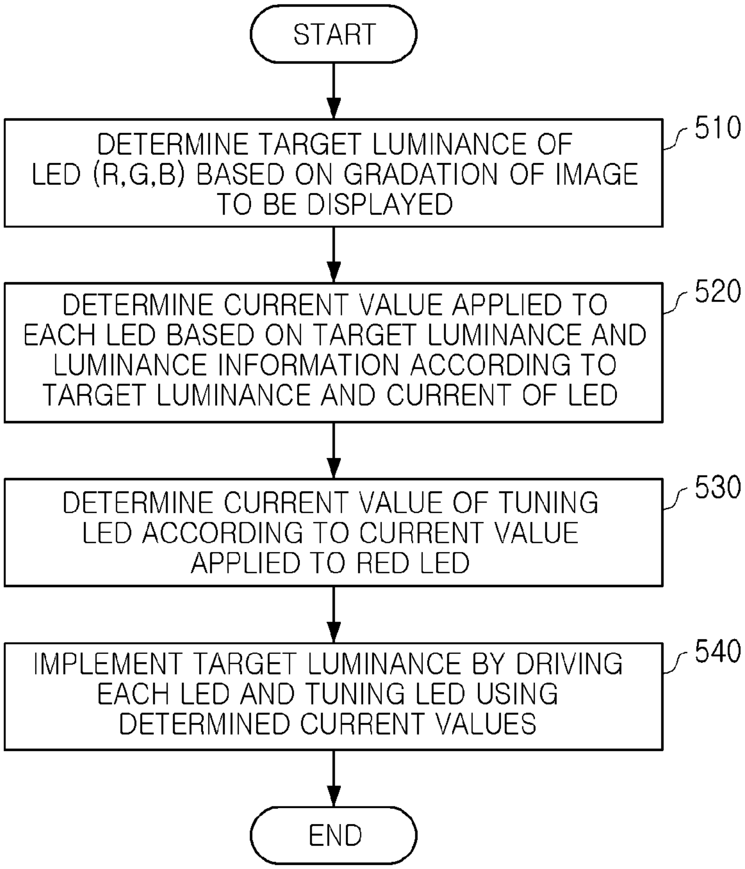
FIG. 11 is a flowchart illustrating a method of driving a display apparatus according to an example embodiment of the present disclosure.

FIG. 11 is a flowchart illustrating a method of driving a display apparatus according to an example embodiment.

Referring to FIG. 11, in the method of driving the display panel according to the example embodiment, target luminance of the LED device of each sub-pixel may be determined based on gradation of an image (S510).

Figure 14:
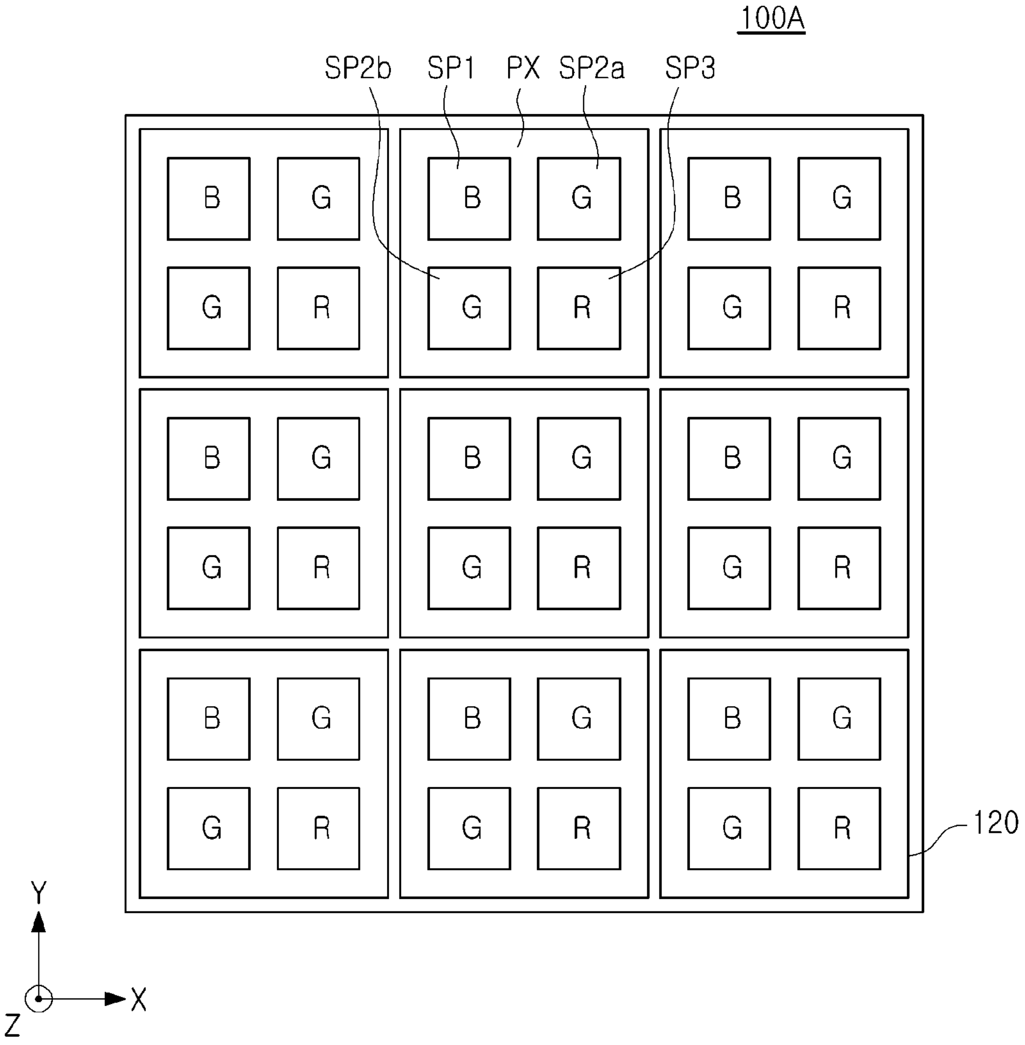
FIG. 14 is a plan diagram illustrating a display apparatus according to an example embodiment of the present disclosure.

In one example embodiment, LED devices included in one pixel may include a blue (B) LED, a green (G) LED, and a red (R) LED (see FIGS. 2 and 14). Here, the green LED may be used to calibrate color change of red light according to current density.

Figure 15:
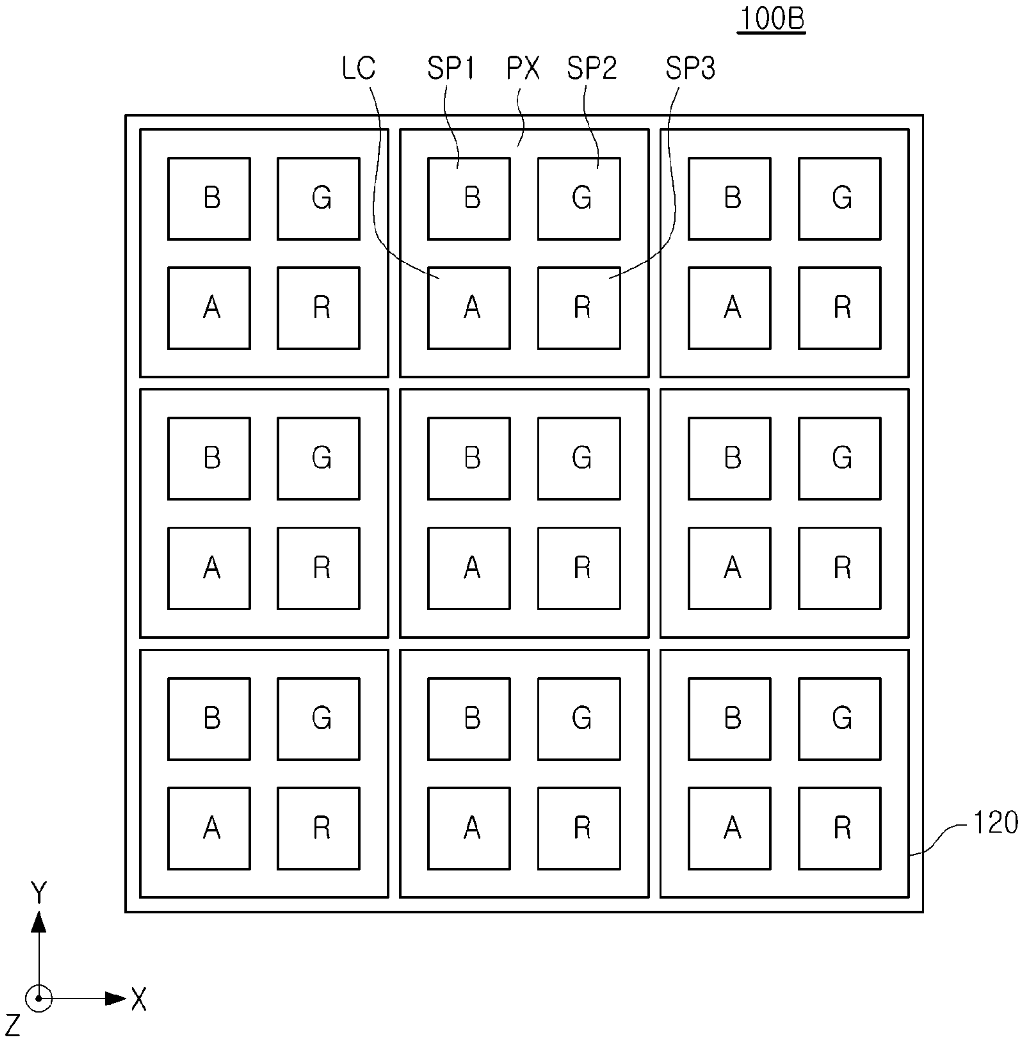
FIG. 15 is a plan diagram illustrating a display apparatus according to an example embodiment of the present disclosure.

In another example embodiment, LED devices included in a pixel may include a blue (B) LED, a green (G) LED, a red (R) LED, and an additional tuning LED (see FIG. 15). An additional tuning LED may be configured to emit light of a wavelength disposed on a locus between the green (G) light and the red (R) light in a 1931 color coordinate system.

In operation S520, a current value applied to each LED device may be determined based on target luminance and luminance information according to the current of the LED device. Thereafter, in operation S530, a current value of the LED for color calibration may be determined according to the current value applied to the red (R) LED.

Specifically, when the target luminance of the red LED is smaller than the predetermined luminance, a current value for the tuning LED for color calibration may be determined. The current value may be increased in proportion to a difference between the target luminance of the red LED and the predetermined luminance.

In example embodiments, the tuning LED for color calibration may be a green LED, and in this case, a final driving current value may be determined by adding a current value for color calibration to a current value for green LED. In another example embodiment, the tuning LED for color calibration may be an additional tuning LED, and in this case, a current value of the tuning LED required for color calibration may be determined.

Thereafter, in operation S540, target luminance may be implemented by driving the LED devices included in the sub-pixel and the Tuning LED using the determined current values. As described in FIGS. 8, 9A and 9B, the current value, that is, the current intensity, may be changed by adjusting an amplitude width of a pulse or an amplitude width and pulse width (duty ratio) of the pulse.

The above-described method of driving a display may be implemented in software and/or hardware for a display apparatus (in particular, a processor). For example, the method may be provided in a non-transitory computer readable medium in which a program for sequentially performing a display driving method is stored. The method of driving a display may be provided to a display apparatus to be executed by a processor in a state stored in a non-transitory readable medium. Here, the non-transitory readable medium may be a medium for storing data semi-permanently and readable by a device, rather than not a medium for storing data for a short moment, such as a register, cache, or memory. Specifically, the various applications or programs described above may be stored and provided in non-transitory readable media such as CD, DVD, hard disk, Blu-ray disk, USB, memory card, ROM, and the like.

Figure 12A:
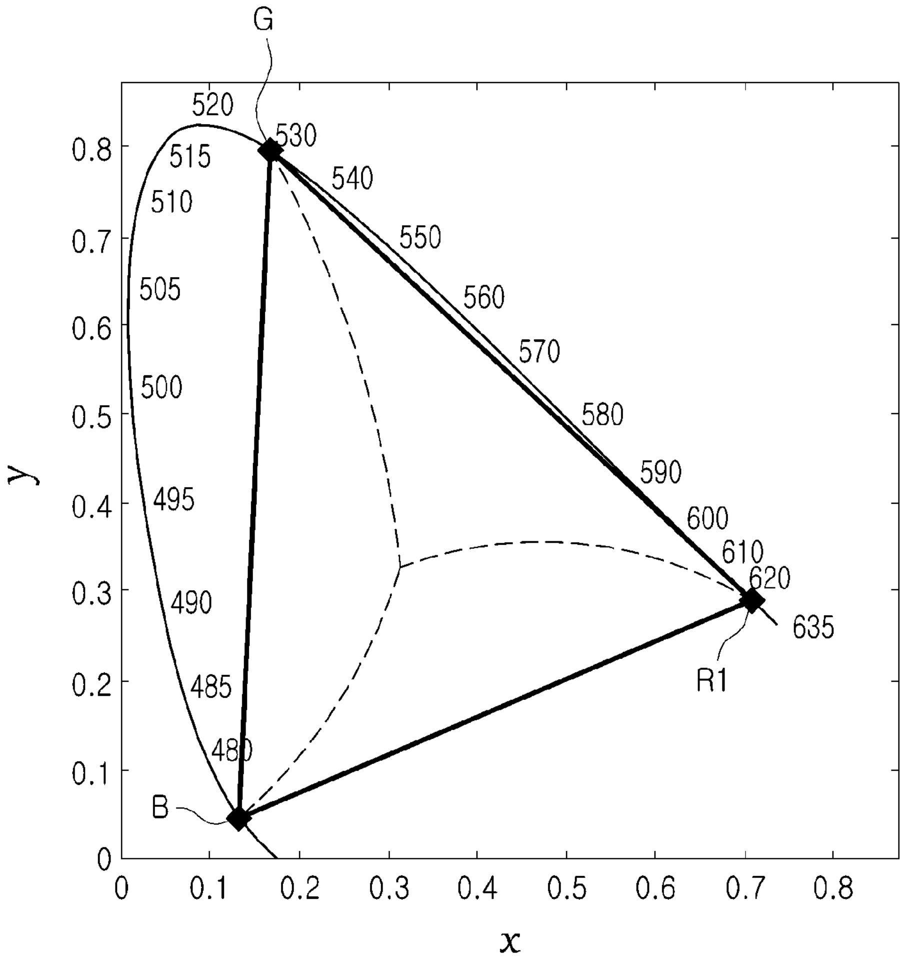
FIGS. 12A and 12B illustrate a 1931 color coordinate system relating to color calibration according to an example embodiment of the present disclosure.
Figure 12B:
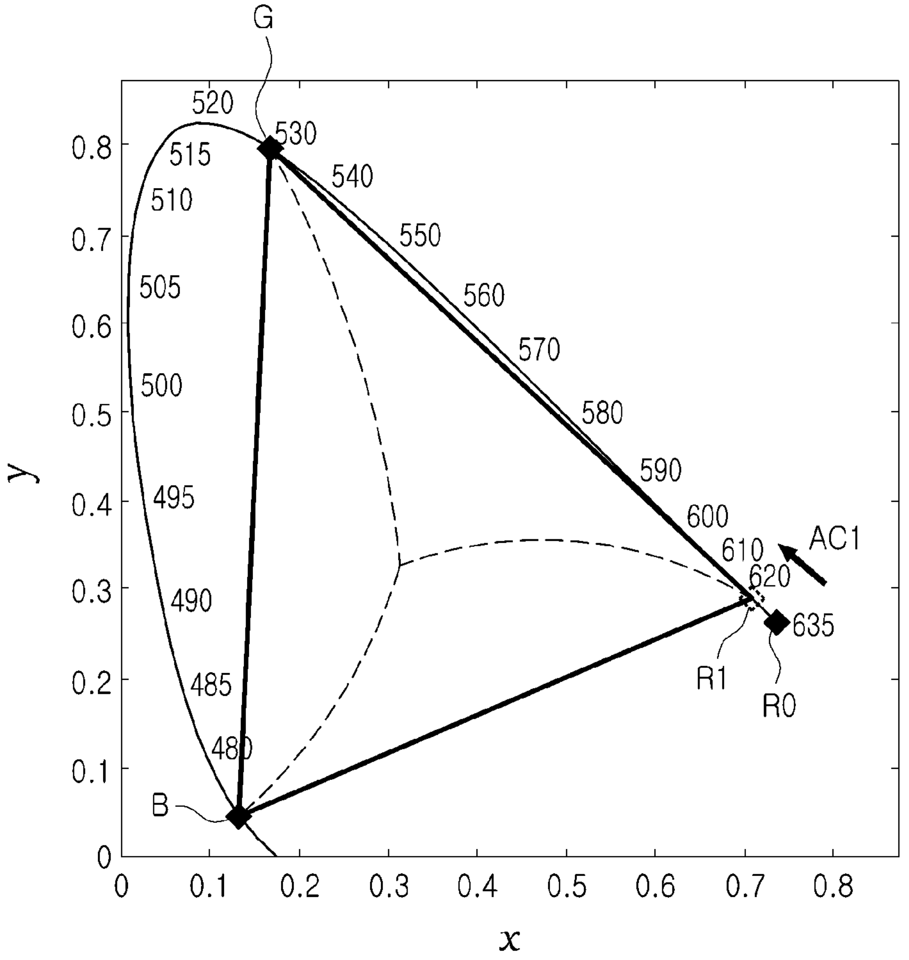

FIGS. 12A and 12B illustrate a 1931 color coordinate system relating to color calibration according to an example embodiment.

FIG. 12A illustrates a color gamut in high gradation which may be implemented by a display apparatus (a pixel) according to an example embodiment.

A first semiconductor light emitting device included in a first sub-pixel may emit blue light having a first color coordinate B. A second semiconductor light emitting device included in a second sub-pixel may emit green light represented by a second color coordinate G. A third semiconductor light emitting device included in a third sub-pixel may emit red light represented by a third color coordinate R1. Here, the third color coordinate R1 may be red light (620 nm) emitted from the third semiconductor light emitting device when current intensity for maximum target luminance is applied.

The display apparatus according to the example embodiment may reproduce a target color gamut defined by the first color coordinate B, the second color coordinate G, and the third color coordinate R1.

FIG. 12B illustrates a color gamut in low gradation which may be implemented by a display apparatus (one pixel) according to an example embodiment.

A first semiconductor light emitting device included in a first sub-pixel may emit blue light represented by a first color coordinate B. A second semiconductor light emitting device included in a second sub-pixel may emit green light represented by a second color coordinate G. In low gradation, red light (635 nm) emitted from a third semiconductor light emitting device included in a third sub-pixel may have a long wavelength and may have a changed color coordinate R0. Accordingly, the color gamut which may be reproduced may be changed according to gradation, but in the example embodiment, as described above, by applying an additional current for driving the second semiconductor light emitting device (green LED), the color coordinate R0 of the red light may be calibrated to a third color coordinate R1 of almost the same level as that of the red light (620 nm) emitted from the third semiconductor light emitting device at high gradation (indicated by "AC1").

The display apparatus according to the example embodiment may be reproduced with a color gamut almost the same as the color gamut in high gradation even in low gradation.

Figure 13:
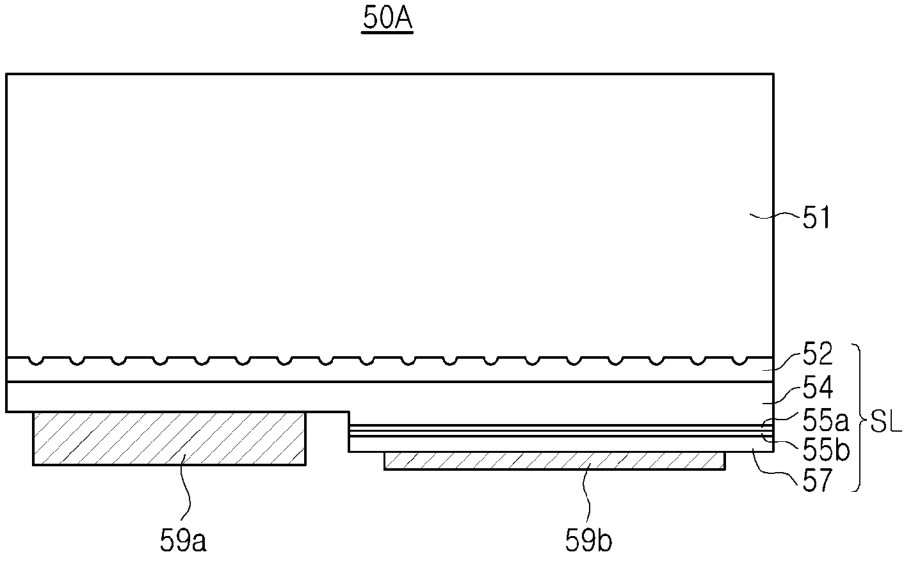
FIG. 13 is a cross-sectional diagram illustrating a red semiconductor light emitting device employable in a display apparatus according to an example embodiment of the present disclosure.

In example embodiments, a red semiconductor light emitting device may include a plurality of active layers emitting light of different wavelengths. FIG. 13 is a cross-sectional diagram illustrating a red semiconductor light emitting device employable in a display apparatus according to an example embodiment.

Referring to FIG. 13, a red semiconductor light emitting device 50A employable in the example embodiment may include first and second active layers 55*a* and 55*b* for emitting light of different wavelengths between the first conductive semiconductor layer 54 and the second conductive semiconductor layer 57. The first active layer 55*a* may be configured to emit first light having a peak wavelength of 510 nm to 610 nm. The second active layer 55*b* may be configured to emit second light having a peak wavelength of 610 nm to 650 nm. The second light may be used as main light of the red semiconductor light emitting device 50A, and the first light may be tuning light and may be provided as auxiliary light. Accordingly, the complex active layer structures 55*a* and 55*b* may be formed such that the second light may have and output higher than that of the first light. For example, the first active layer 55*a* may include a quantum well layer, and the second active layer 55*b* may include a greater number (e.g., 3 to 6) of quantum well layers.

FIG. 14 is a plan diagram illustrating a display apparatus according to an example embodiment.

Referring to FIG. 14, the display apparatus 100A according to the example embodiment may be similar to the display apparatus 100 illustrated in FIGS. 1 to 6, other than the configuration in which each pixel PX may include a Bayer pattern, and at least one of the green LEDs G in each pixel PX may be used as an LED for adjustment. Also, components in the example embodiment may be understood by referring to the descriptions of the same or similar components of the display apparatus 300 illustrated in FIGS. 1 to 6 unless otherwise indicated.

The display panel 100A in the example embodiment may include pixels having a Bayer pattern. Each pixel PX may include four sub-pixels SP1, SP2*a*, SP2*b*, and SP3. Each pixel PX may have first and third semiconductor light emitting devices B and R arranged in a first diagonal direction, and two second semiconductor light emitting devices G and G arranged in a second diagonal direction intersecting the first diagonal direction.

The first semiconductor light emitting device B may be configured to emit light having a peak wavelength of 440 nm-480 nm, and two second semiconductor light emitting devices G and G may be configured to emit light having a peak wavelength of 510 nm-550 nm. Also, the third semiconductor light emitting device R may be configured to emit light having a peak wavelength of 610 nm-650 nm. As a Tuning LED to which an additional current is applied, one of two second semiconductor light emitting devices G and G may be selected and used. In example embodiments, the second semiconductor light emitting devices G and G may include green light having different peak wavelengths.

FIG. 15 is a plan diagram illustrating a display apparatus according to an example embodiment.

Referring to FIG. 15, the display apparatus 100B according to the example embodiment may be similar to the display apparatus 100 illustrated in FIGS. 1 to 6 other than the configuration in which each pixel PX may include four semiconductor light emitting devices B, G, A, and R similar to the Bayer pattern, and the configuration in which each pixel may be used as an LED LC for adjustment. Also, components in the example embodiment may be understood by referring to the descriptions of the same or similar components of the display apparatus 100 illustrated in FIGS. 1 to 6 unless otherwise indicated.

The display panel 100 in the example embodiment may include pixels having a Bayer pattern, similarly to the aforementioned example embodiment. Each pixel PX may include three sub-pixels SP1, SP2, and SP3 and a tuning LED LC.

The semiconductor light emitting devices in the example embodiment may include a first semiconductor light emitting device B configured to emit blue light, a second semiconductor light emitting device G configured to emit green light, a third semiconductor light emitting device R configured to emit red light, and a fourth semiconductor light emitting device A configured to emit tuning light having a peak wavelength between the wavelength of the green light and the peak wavelength of the red light. In example embodiments, the fourth semiconductor light emitting device may be configured to emit light having a peak wavelength of 510 nm-610 nm. For example, the tuning light may be an amber or yellow light. In the display apparatus according to the example embodiment, when target luminance of the third semiconductor light emitting device is smaller than predetermined luminance, red light may have a long wavelength, and accordingly, for calibration of red light to maintain a color gamut, a current may be applied to the fourth semiconductor light emitting device.

Figure 16A:
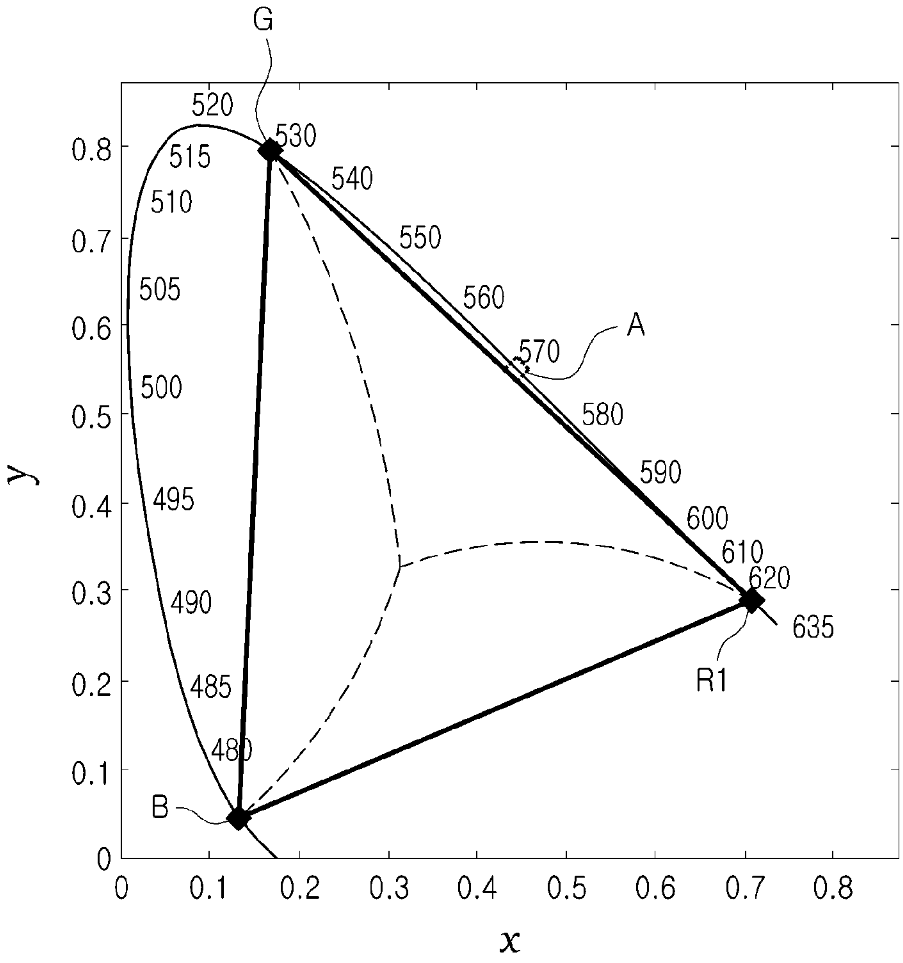
FIGS. 16A and 16B illustrate a 1931 color coordinate system relating to color calibration according to an example embodiment of the present disclosure.
Figure 16B:
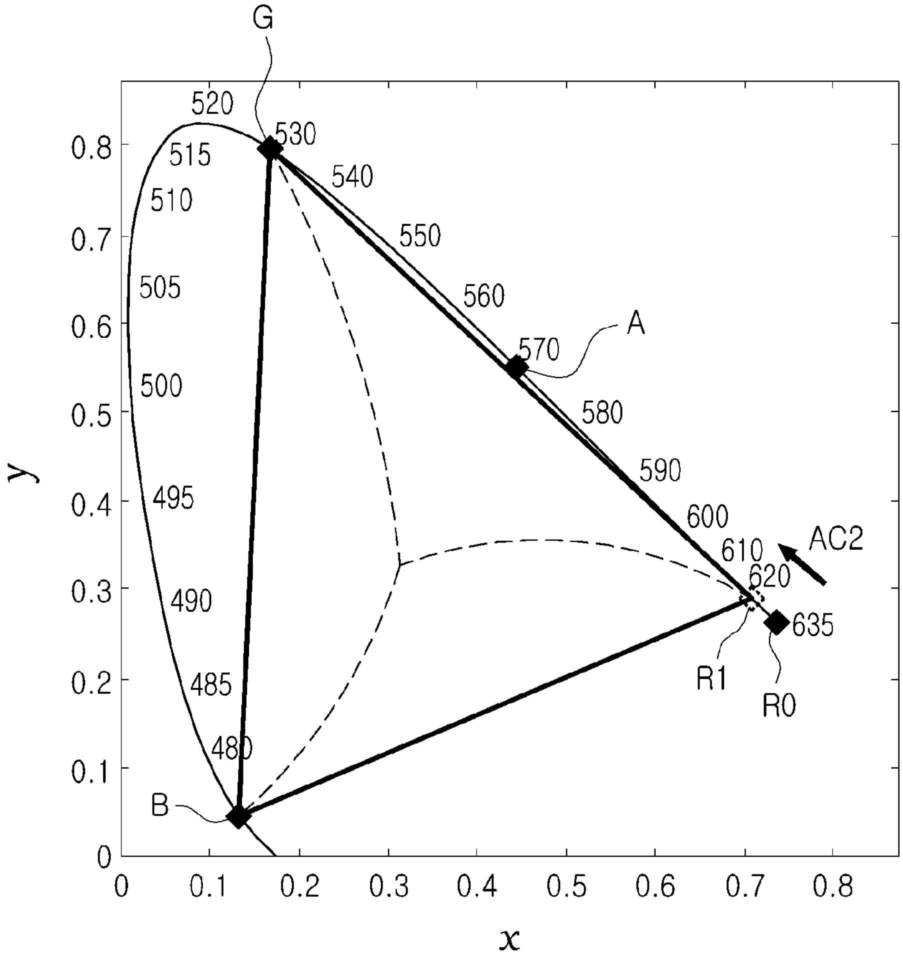

FIGS. 16A and 16B illustrate a 1931 color coordinate system relating to color calibration according to an example embodiment. The color calibration according to the example embodiment may be understood as a color calibration process implemented in the display apparatus illustrated in FIG. 15.

FIG. 16A illustrates a color gamut in high gradation which may be implemented by a display apparatus (a pixel) according to an example embodiment.

A first semiconductor light emitting device included in a first sub-pixel may emit blue light having a first color coordinate B. A second semiconductor light emitting device included in a second sub-pixel may emit green light represented by a second color coordinate G. A third semiconductor light emitting device included in a third sub-pixel may emit red light represented by a third color coordinate R1. Here, the third color coordinate R1 may be red light (620 nm) emitted from the third semiconductor light emitting device when current intensity for maximum target luminance is applied.

The display apparatus according to the example embodiment may reproduce a target color gamut defined by the first color coordinate B, the second color coordinate G, and the third color coordinate R1.

FIG. 16B illustrates a color gamut in low gradation which may be implemented by a display apparatus (a pixel) according to an example embodiment.

A first semiconductor light emitting device included in a first sub-pixel may emit blue light represented by a first color coordinate B. A second semiconductor light emitting device included in a second sub-pixel may emit green light represented by a second color coordinate G. In low gradation, red light (635 nm) emitted from a third semiconductor light emitting device included in a third sub-pixel may have a long wavelength and may have a changed color coordinate R0. Accordingly, a color gamut which may be reproduced may be changed according to gradation, but in the example embodiment, by driving the tuning LED A for color calibration, the color coordinate R0 of the red light may be calibrated to a third color coordinate R1 of almost the same level as that of the red light (620 nm) emitted from the third semiconductor light emitting device in high gradation (indicated by "AC2"). As described above, the tuning LED may have a fourth color coordinate (A) disposed on a locus between the green light and the red light in the 1931 color coordinate system.

As described above, the display apparatus according to the example embodiment may be reproduced with a color gamut almost the same as a color gamut in high gradation even in low gradation.

According to the aforementioned example embodiments, the display apparatus may provide a display module providing improved color reproducibility through color calibration of a wavelength change according to a current density of semiconductor LEDs included in a specific sub-pixel (e.g., R), and a method of driving the same.

While the example embodiments have been illustrated and described above, it will be apparent to those skilled in the art that modifications and variations can be made without departing from the scope of the present disclosure as defined by the appended claims.

What is claimed is:

1. A display apparatus comprising:

a display panel comprising a plurality of pixels, each pixel of the plurality of pixels comprising a plurality of semiconductor light emitting devices configured to emit light of different colors;

a display panel driver configured to drive the display panel by applying a current to each semiconductor light emitting device of the plurality of semiconductor light emitting devices;

a memory configured to store current intensity information according to a target luminance for each semiconductor light emitting device of the plurality of semiconductor light emitting devices; and a processor configured to obtain the current intensity information from the memory based on gradation of an image to be displayed, and control the display panel driver to apply the current to each of the plurality of semiconductor light emitting devices based on the current intensity information, wherein the plurality of semiconductor light emitting devices of each pixel of the plurality of pixels comprises a first semiconductor light emitting device configured to emit blue light, a second semiconductor light emitting device configured to emit green light, and a third semiconductor light emitting device configured to emit red light, and wherein the processor is further configured to, based on a target luminance of the third semiconductor light emitting device being smaller than a predetermined luminance, control the display panel driver to apply an additional current to the second semiconductor light emitting device.

2. The display apparatus of claim 1, wherein the display apparatus has a target color gamut defined by a first color coordinate corresponding to the blue light, a second color coordinate corresponding to the green light, and a third color coordinate corresponding to the red light, and wherein the third color coordinate is a color coordinate of red light emitted from the third semiconductor light emitting device when a current intensity for maximum target luminance is applied.

3. The display apparatus of claim 1, wherein the processor is further configured to control the display panel driver to apply the additional current to the second semiconductor light emitting device such that the additional current increases in proportion to a difference between the target luminance of the third semiconductor light emitting device and the predetermined luminance.

4. The display apparatus of claim 1, wherein a difference between a peak wavelength of light emitted at a first current intensity for a maximum target luminance and a peak wavelength of light emitted at a second current intensity for a minimum target luminance in the third semiconductor light emitting device is at least 10 nm.

5. The display apparatus of claim 1, wherein the first semiconductor light emitting device comprises a first active layer configured to emit light having a peak wavelength in a range of 440 nm to 480 nm, wherein the second semiconductor light emitting device comprises a second active layer configured to emit light having a peak wavelength of in a range of 510 nm to 550 nm, and wherein the third semiconductor light emitting device comprises a third active layer configured to emit light having a peak wavelength of in a range of 610 nm to 650 nm.

6. The display apparatus of claim 5, wherein each of the first semiconductor light emitting device, the second semiconductor light emitting device, and the third semiconductor light emitting device comprises a nitride single crystal, and wherein the first active layer, the second active layer, and the third active layer comprise InGaN quantum well layers having different indium composition ratios.

7. The display apparatus of claim 1, wherein the first semiconductor light emitting device, the second semiconductor light emitting device, and the third semiconductor light emitting device of each pixel of the plurality of pixels are arranged in a first diagonal direction, and wherein the plurality of semiconductor light emitting devices of each pixel of the plurality of pixels further comprises two second semiconductor light emitting devices arranged in a second diagonal direction that intersects the first diagonal direction.

8. The display apparatus of claim 7, wherein the additional current is applied to one of the two second semiconductor light emitting devices.

9. The display apparatus of claim 1, wherein the third semiconductor light emitting device comprises a first active layer configured to emit first light having a peak wavelength in a range of 510 nm to 610 nm, and a second active layer configured to emit second light having a peak wavelength in a range of 610 nm to 650 nm, and wherein the second light has an output greater than an output of the first light.

10. The display apparatus of claim 1, wherein the display panel driver comprises a pulse amplitude modulation (PAM) driver circuit configured to control an amplitude width of a driving current based on the current intensity information.

11. The display apparatus of claim 10, wherein the display panel driver further comprises a pulse width modulation (PWM) driver circuit configured to control a pulse width of the driving current based on the current intensity information.

12. A display apparatus comprising:

a display panel comprising a plurality of pixels, each pixel of the plurality of pixels comprising a plurality of semiconductor light emitting devices configured to emit light of different colors;

a display panel driver configured to drive the display panel by applying a current to each pixel of the plurality of semiconductor light emitting devices;

a memory configured to store current intensity information according to target luminance for each semiconductor light emitting device of the plurality of semiconductor light emitting devices; and a processor configured to obtain the current intensity information from the memory based on gradation of an image to be displayed, and control the display panel driver to apply the current to each semiconductor light emitting device of the plurality of semiconductor light emitting devices based on the current intensity information, wherein the plurality of semiconductor light emitting devices comprises a first semiconductor light emitting device configured to emit blue light, a second semiconductor light emitting device configured to emit green light, a third semiconductor light emitting device configured to emit red light, and a fourth semiconductor light emitting device configured to emit tuning light having a peak wavelength between a wavelength of the green light and a peak wavelength of the red light, and wherein the processor is further configured to, based on the target luminance of the third semiconductor light emitting device being less than a predetermined luminance, control the display panel driver to apply a current to the fourth semiconductor light emitting device.

13. The display apparatus of claim 12, wherein the display apparatus has a target color gamut defined by a first color coordinate corresponding to the blue light, a second color coordinate corresponding to the green light, and a third color coordinate corresponding to the red light, and wherein the third color coordinate is a color coordinate of red light emitted from the third semiconductor light emitting device when current intensity for maximum target luminance is applied.

14. The display apparatus of claim 13, wherein the tuning light has a fourth color coordinate disposed on a locus between the green light and the red light in a 1931 color coordinate system.

15. The display apparatus of claim 13, wherein the tuning light has a peak wavelength in a range of 510 nm to 610 nm.

16. The display apparatus of claim 12, wherein the processor is further configured to control the display panel driver to apply the current to the fourth semiconductor light emitting device such that the current increases in proportion to a difference between the target luminance of the third semiconductor light emitting device and the predetermined luminance.

17. The display apparatus of claim 12, wherein the display panel driver comprises a pulse amplitude modulation (PAM) driver circuit configured to control an amplitude width of a driving current based on the current intensity information.

18. A display apparatus comprising:

a display panel comprising a plurality of pixels, each pixel of the plurality of pixels comprising a first semiconductor light emitting device configured to emit blue light, a second semiconductor light emitting device configured to emit green light, and a third semiconductor light emitting device configured to emit red light;

a display panel driver configured to apply a first current, a second current, and a third current to the first semiconductor light emitting device, the second semiconductor light emitting device, and the third semiconductor light emitting device, respectively; and a processor configured to control the display panel driver to apply the first current, the second current, and the third current to the first semiconductor light emitting device, the second semiconductor light emitting device, and the third semiconductor light emitting device, respectively, based on gradation of an image to be displayed, wherein the processor is further configured to:

based on the third current of the third semiconductor light emitting device being less than predetermined reference current, control the display panel driver to apply an additional current to the second semiconductor light emitting device, and based on the third current of the third semiconductor light emitting device being greater than the predetermined reference current, control the display panel driver to not apply the additional current to the second semiconductor light emitting device.

19. The display apparatus of claim 18, wherein the display apparatus has a target color gamut defined by a first color coordinate corresponding to the blue light, a second color coordinate corresponding to the green light, and a third color coordinate corresponding to the red light, and wherein the third color coordinate is a color coordinate of red light emitted from the third semiconductor light emitting device when a current intensity for a maximum target luminance is applied.

20. The display apparatus of claim 18, wherein the display panel driver comprises a pulse amplitude modulation (PAM) driver circuit configured to control changes in intensities of the first current, the second current, and the third current by an amplitude width of a driving current.

* * * * *